United States Patent [19]

Antonowitz

[11] Patent Number: 4,920,304

[45] Date of Patent: Apr. 24, 1990

[54] VENT ACTUATOR

[76] Inventor: Frank P. Antonowitz, 1 Sea Esta Pl., Ventura, Calif. 93003

[21] Appl. No.: 362,523

[22] Filed: Jun. 7, 1989

[51] Int. Cl.$^5$ .............................................. B60J 7/08
[52] U.S. Cl. .................................... 318/466; 318/266; 49/349; 49/357; 49/360
[58] Field of Search ............... 318/255, 256, 265, 266, 318/466, 467, 468; 49/14, 17, 18, 115, 118, 121, 139, 140, 340, 349, 357, 360

[56] References Cited

U.S. PATENT DOCUMENTS

| | | | |
|---|---|---|---|
| 2,905,463 | 9/1959 | Borden | 49/118 X |
| 3,403,474 | 10/1968 | Spasoff | 49/360 |
| 3,439,454 | 4/1969 | Stretton | 49/139 X |
| 4,050,191 | 9/1977 | Azuma | 49/118 X |
| 4,068,799 | 1/1978 | Brodin . | |
| 4,142,761 | 3/1979 | Lutz et al. . | |
| 4,143,556 | 3/1979 | Hauber . | |
| 4,171,594 | 10/1979 | Colanzi | 49/349 |
| 4,186,524 | 2/1980 | Pelchat . | |
| 4,314,692 | 2/1982 | Brauer et al. | 49/139 X |
| 4,420,185 | 12/1983 | Bienert et al. . | |
| 4,691,475 | 9/1987 | Maekawa | 49/360 X |

*Primary Examiner*—Bentsu Ro
*Attorney, Agent, or Firm*—Jerry T. Kearns

[57] ABSTRACT

An actuator for a vent in a vehicle includes a motor actuated by a dashboard mounted switch. In a first embodiment, a slider is received for reciprocal linear movement along a guide track mounted adjacent the vent. A first end of an actuating arm is pivotally connected to the slider and a second end is pivotally connected to the vent. A drive cable is supported by a pair of pulleys mounted at opposite ends of the guide track. A DC permanent magnet motor is connected for rotating one of the pulleys in opposite directions. A capacitor is selectively connected by a relay for discharge through the motor to actuate the vent. A three position switch has a first position for charging the capacitor in a first polarity, a second position for charging the capacitor to an opposite polarity and a third position for energizing the relay to discharge the capacitor through the motor. A variable resistor is connected between the capacitor and the motor for controlling the motor by regulating the discharge rate of the capacitor. An electromagnetic clamp retains the actuating arm in an adjusted position. In a second embodiment, a mounting bracket mounted adjacent the vent includes an actuating arm having an arcuate gear segment in engagement with a drive gear. A servo motor is connected for rotating the drive gear in response to a dashboard mounted servo actuator. A solenoid stop pin or an electromagnetic clamp may be provided to maintain the actuating arm in an adjusted position.

17 Claims, 7 Drawing Sheets

VENT ACTUATOR

BACKGROUND OF THE INVENTION

1. Field of the Invention

The present invention relates to vent actuators, and more particularly pertains to a new and improved vent actuator designed for use in opening roof vents on vehicles such as pick up truck mounted campers and motor homes. The conventional form of roof vent is manually pivoted to an open position. This requires an individual travelling alone to stop the vehicle in order to open the vent. In order to overcome this problem, and to provide a control for the position of the vent, the present invention provides a motorized remote actuator controlled by a dashboard mounted switch.

2. Description of the Prior Art

Various types of vent actuators are known in the prior art. A typical example of such a vent actuator is to be found in U.S. Pat. No. 4,068,799, which issued to E. Brodin on Jan. 17, 1978. This patent discloses an automatic ventilation regulating device for windows, doors and the like, including a spindle, a slide displaceable along the spindle, a driving motor for displacing the slide on the spindle, and a settable thermostat arranged for controlling the operation of the motor in response to the temperature in the room to be ventilated. U.S. Pat. No. 4,142,761, which issued to A. Lutz et al on Mar. 6, 1979, discloses a vehicle roof opening having a detachable tiltable cover. In order to tilt the cover, a telescoping device is provided at the rear end thereof, which is attachable to the cover. U.S. Pat. No. 4,143,556, which issued to P. Hauber on Mar. 13, 1979, discloses a motorized vent actuator for controlling the position of an edge opening vent in the roof of a recreational vehicle. The vent operator is coupled to an electric motor by a set of reduction gears which drive two pivotal sector arms which raise or lower the vent cover. U.S. Pat. No. 4,186,524, which issued to P. Pelchat on Feb. 5, 1980, discloses a vent actuator for a pivotable vehicle window. A vehicle power window actuator for pivoting a glass view panel about an axis includes a wire cable having a jack screw portion rotated by an electric motor to produce linear movement of the cable. U.S. Pat. No. 4,420,185, which issued to H. Bienert et al on Dec. 13, 1983, discloses a drive arrangement for a motor vehicle top having an outwardly movable sliding cover driven by an electric motor through a transmission and at least one threaded cable engaging a pinion of the transmission. A manually actuated switch and a limit switch with a contact arm are provided in a circuit of the electric motor. The contact arm cooperates with a cam of a trip gear to interrupt the current supply to the electric motor in a closed position of the sliding cover.

While the above mentioned devices are suited for their intended usage, none of these devices disclose a remote vent actuator which includes a motor energized by the discharge of a capacitor to actuate vent operating linkage. Additionally, none of the aforesaid devices disclose the use of a servo mechanism for allowing precise positional control of a pivotal vent. Additional features of the present invention, not contemplated by the aforesaid prior art devices include the provision of a variable resistor and capacitor circuit connected to a three position switch for selectively charging the capacitor in either of two opposite polarities and for energizing a relay to discharge the capacitor through an actuating motor. Inasmuch as the art is relatively crowded with respect to these various types of vent actuators, it can be appreciated that there is a continuing need for and interest in improvements to such vent actuators, and in this respect, the present invention addresses this need and interest.

SUMMARY OF THE INVENTION

In view of the foregoing disadvantages inherent in the known types of vent actuators now present in the prior art, the present invention provides an improved vent actuator. As such, the general purpose of the present invention, which will be described subsequently in greater detail, is to provide a new and improved vent actuator which has all the advantages of the prior art vent actuators and none of the disadvantages.

To attain this, representative embodiments of the concepts of the present invention are illustrated in the drawings and make use of an actuator for opening a vent in a vehicle including a motor actuated by a dashboard mounted switch. In a first embodiment, a slider is received for reciprocal linear movement along a guide track mounted adjacent the vent. A first end of an actuating arm is pivotally connected to the slider and a second end is pivotally connected to the vent. A drive cable is supported by a pair of pulleys mounted at opposite ends of the guide track. A DC permanent magnet motor is connected for rotating one of the pulleys in opposite directions. A capacitor is selectively connected by a relay for discharge through the motor to actuate the vent. A three position switch has a first position for charging the capacitor in a first polarity, a second position for charging the capacitor to an opposite polarity and a third position for energizing the relay to discharge the capacitor through the motor. A variable resistor is connected between the capacitor and the motor for controlling the motor by regulating the discharge rate of the capacitor. An electromagnetic clamp retains the actuating arm in an adjusted position. In a second embodiment, a mounting bracket mounted adjacent the vent includes an actuating arm having an arcuate gear segment in engagement with a drive gear. A servo motor is connected for rotating the drive gear in response to a dashboard mounted servo actuator. A solenoid stop pin or an electromagnetic clamp may be provided to maintain the actuating arm in an adjusted position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vent actuator which has all the advantages of the prior art vent actuators and none of the disadvantages.

It is another object of the present invention to provide a new and improved vent actuator which may be easily and efficiently manufactured and marketed.

It is a further object of the present invention to provide a new and improved vent actuator which is of a durable and reliable construction.

An even further object of the present invention is to provide a new and improved vent actuator which is susceptible of a low cost of manufacture with regard to both materials and labor, and which accordingly is then susceptible of low prices of sale to the consuming public, thereby making such vent actuators economically available to the buying public.

Still yet another object of the present invention is to provide a new and improved vent actuator which provides in the apparatuses and methods of the prior art some of the advantages thereof, while simultaneously overcoming some of the disadvantages normally associated therewith.

Still another object of the present invention is to provide a new and improved vent actuator to enable remote control of a recreational vehicle roof vent opening.

Yet another object of the present invention is to provide a new and improved vent actuator which provides precise positional control of a pivotal vent.

Even still another object of the present invention is to provide a new and improved vent actuator which allows selective actuation of a motor for a time determined by the discharge of a capacitor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
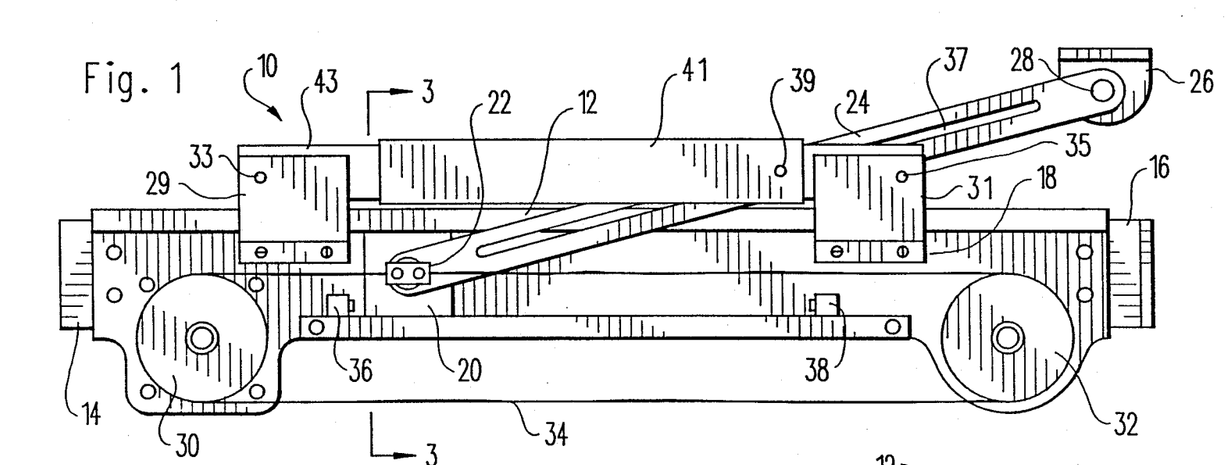
FIG. 1 is a side view illustrating the actuating linkage of a vent actuator according to the first embodiment of the present invention.

With reference now to the drawings, and in particular to FIG. 1 thereof, a new and improved vent actuator embodying the principles and concepts of the present invention and generally designated by the reference numeral 10 will be described.

More specifically, it will be noted that the first embodiment 10 of the invention includes a guide track 12 adapted for mounting adjacent the pivotal vent in the roof of a recreational vehicle. The construction of such vents is conventional and reference may be had to U.S. Pat. No. 4,143,556, the disclosure of which is hereby incorporated by reference, for a description of the conventional form of pivotal recreational vehicle roof vent. The guide track 12 includes a pair of mounting brackets 14 and 16 for securing the guide track 12 in place. An undercut guide channel 18 in the guide track 12 receives a slider 20 for reciprocal linear movement. The slider 20 is secured for movement with a flexible endless drive member 34 by a clamping sleeve 22. The flexible endless drive member 44 is preferably a nylon cable supported for rotation between pulleys 30 and 32. A pivotal actuating arm 24 has a first end pivotally secured to the slider 20 and a second end pivotally secured at 28 to a bracket 26 adapted for securement with the pivotal roof vent. A pair of switches 36 and 38 are disposed at opposite ends of the guide channel 18 and serve as position indicating switches which actuate a pair of lights mounted in a remote control unit on the dashboard of the vehicle. Thus, when the slider 20 contacts the switch 36, the vent connected to the bracket 26 will be in a closed position and the "CLOSED" position indicating light will be illuminated. When the slider 20 travels to the opposite end of the guide channel 18, the switch 38 will be actuated, illuminating the "OPEN" position indicating light. A pair of bifurcated brackets 29 and 31 are secured to the guide track 12 and mount a pair of spaced parallel caliper arms, one of which is illustrated at 43, for lateral movement along transverse pins 33 and 35. A pin 39 is received transversely through the caliper arms and through a slot 37 formed in the actuating arm 24. The caliper arms are free to move together or apart along the pins 33, 35 and 39. Both of the caliper arms are formed by iron bars wrapped with a coil of wire and covered by a rubber coating 41, to enhance frictional engagement with the arm 24.

Figure 2:
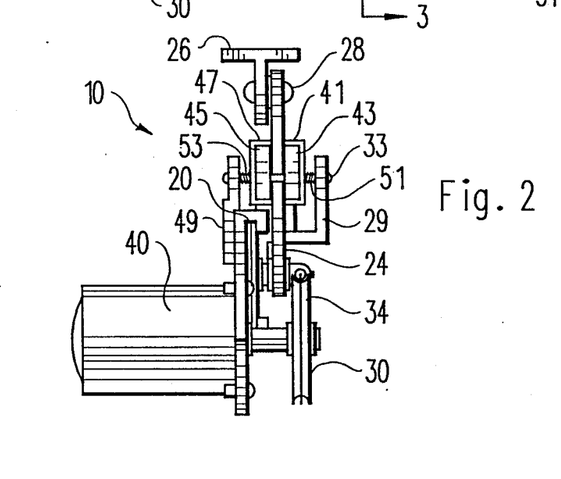
FIG. 2 is an end view of the actuating linkage of FIG. 1.

FIG. 2 illustrates an end view which illustrates a drive motor 40 connected for rotating the pulley 30. The caliper arms 43 and 45 are biased together, into clamping engagement with the arm 24 by springs 51 and 53 received around the pins 33 and 35. The rubber coated portions 41 and 47 frictionally retain the actuating arm in a selected adjusted position. Upon electrical actuation of the coils on the caliper arms 43 and 45, the calipers are forced apart by electromagnetic forces and release the actuating arm 24 for adjustment. This arrangement prevents the adjusted position of the roof vent from being altered by vibration or wind force.

Figure 3:
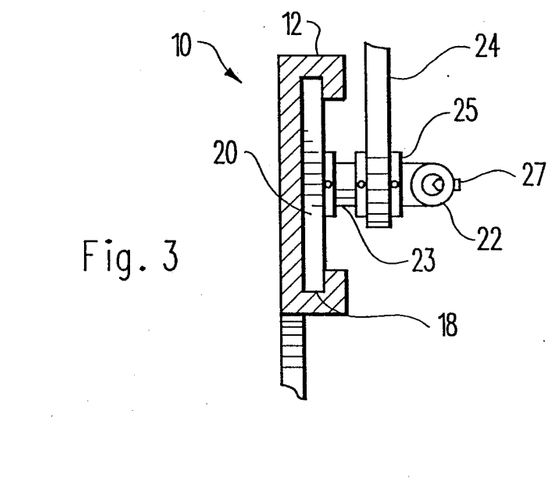
FIG. 3 is a transverse cross sectional view, taken along line 3—3 of FIG. 1.

FIG. 3 illustrates a transverse cross sectional view, taken along line 3—3 of FIG. 1, with the clamping mechanism omitted. The slider 20 includes a transversely extending shaft 23 which receives a journal bearing 25 at the first end of the actuating arm 24. A clamping sleeve 22 is provided at the outer end of the shaft 23 and includes a plurality of set screws 27 for clamping engagement with the flexible endless drive member 34, as shown in FIG. 1. The slider 20 is preferably formed from a low friction nylon material for low friction movement along the guide channel 18.

Figure 4:
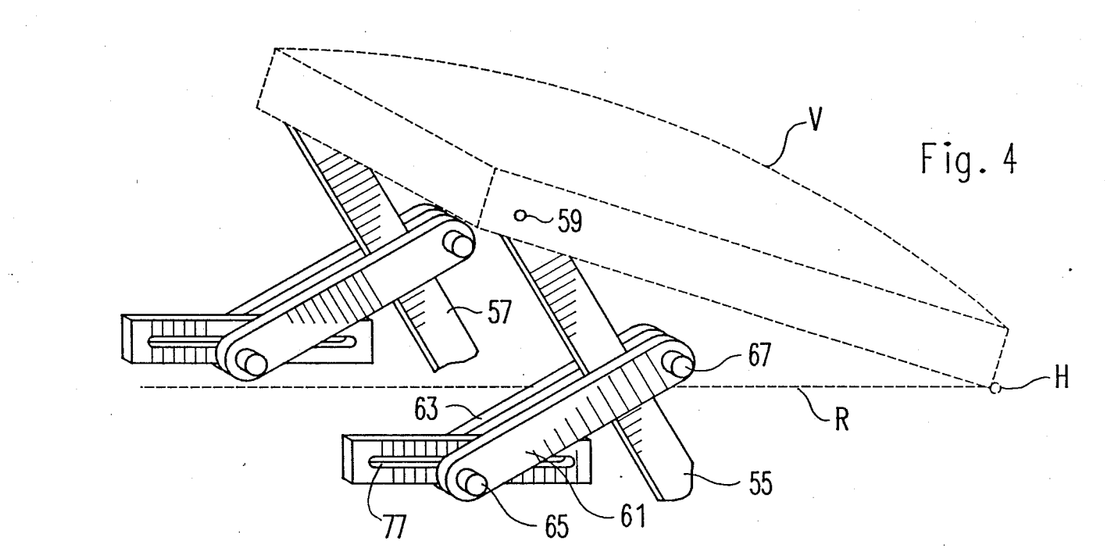
FIG. 4 is a perspective view illustrating an alternative electromagnetic actuating arm clamping arrangement.

FIG. 4 illustrates an alternative electromagnetic clamping arrangement for maintaining a pair of vent actuating arms 55 and 57 in a selected adjusted position. The arms are pivotally attached at 59 at opposite corners of a conventional roof vent V mounted by a hinge H in the roof of a vehicle. A pair of caliper arms 61 and 63 are disposed on opposite sides of the actuating arm 55 and are mounted for lateral movement along pins 65 and 67. A guide pin (not shown) on the caliper 63 is received in a slotted slider 77. A similar mechanism is provided on the arm 57. It should be noted that either a single actuating arm or the illustrated dual arm system may be employed without departing from the scope of the invention.

Figure 5:
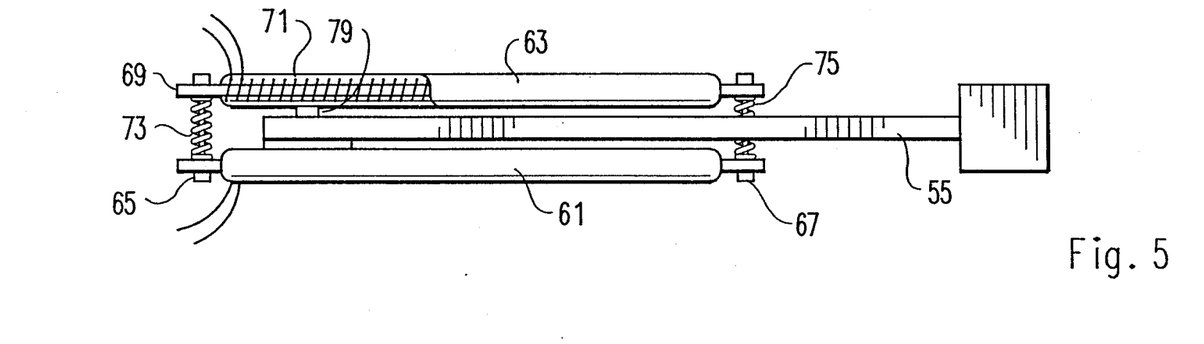
FIG. 5 is a detail view further illustrating the clamping arrangement of FIG. 4.

FIG. 5 is a detail view which illustrates stretched tensional coil springs 73 and 75 received around the pins 65 and 67. The springs 73 and 75 each have opposite ends secured to the calipers 61 and 63, and thus pull the calipers together into clamping engagement with the actuating arm 55. The guide pin 79 on the caliper 63 is received in the slotted slider 77 shown in FIG. 4. The calipers each include an iron bar 69 wrapped by a coil 71 and coated with rubber to provide a frictional gripping surface. Upon electrical energization of the coils in the caliper arms, they will be repelled by electromagnetic forces and thus release the arm 55 enabling adjustment of the vent position.

Figure 6:
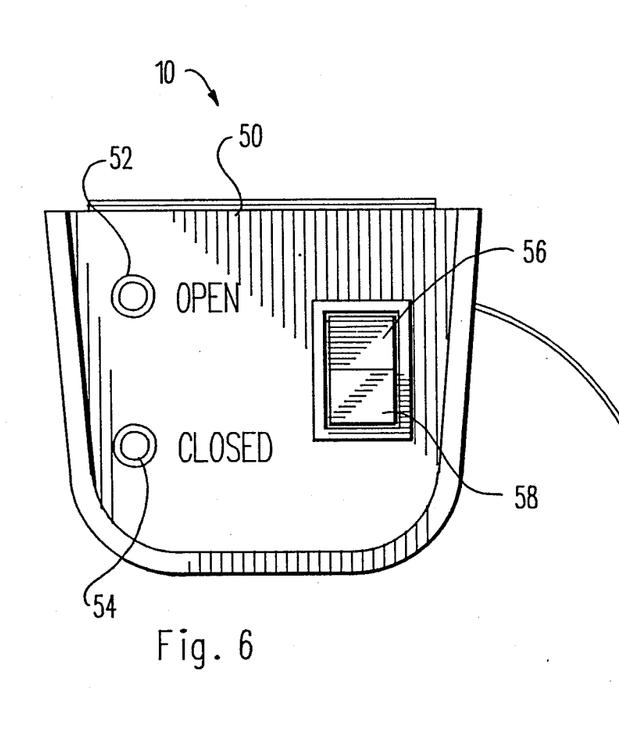
FIG. 6 is a front view illustrating a remote control unit according to a first embodiment of the present invention.

FIG. 6 illustrates a remote control unit 50 adapted for mounting on the dashboard of the vehicle. The unit 50 includes a pair of indicating lights 52 and 54 connected to the switches 36 and 38 illustrated in FIG. 1. A three position rocker switch has a first upper actuating portion 56 and a lower actuating portion 58. The switch is spring biased to a central position.

Figure 7:
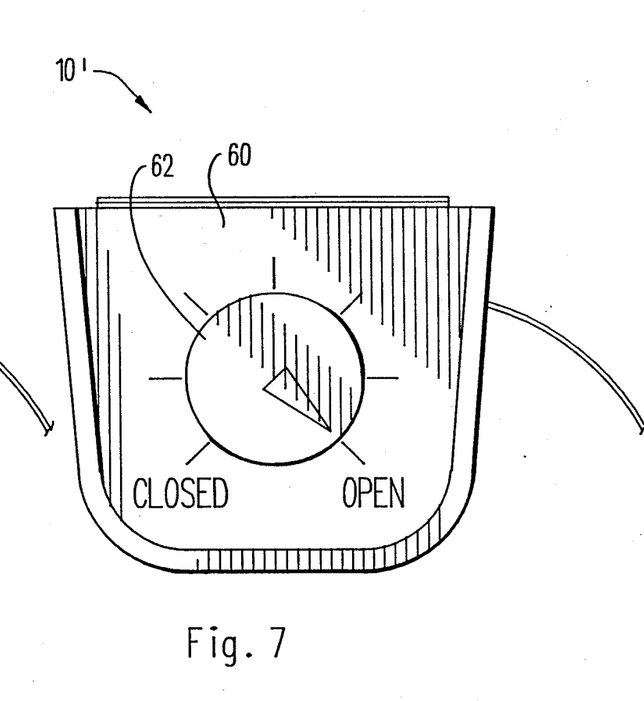
FIG. 7 is a front view of a remote control servo unit according to a second embodiment of the present invention.

FIG. 7 illustrates a remote control unit 60 utilized with a second embodiment 10' of the present invention. The control unit 60 includes a servo actuator 62 and indicia representing the degree of opening of the pivotal roof vent.

Figure 8:
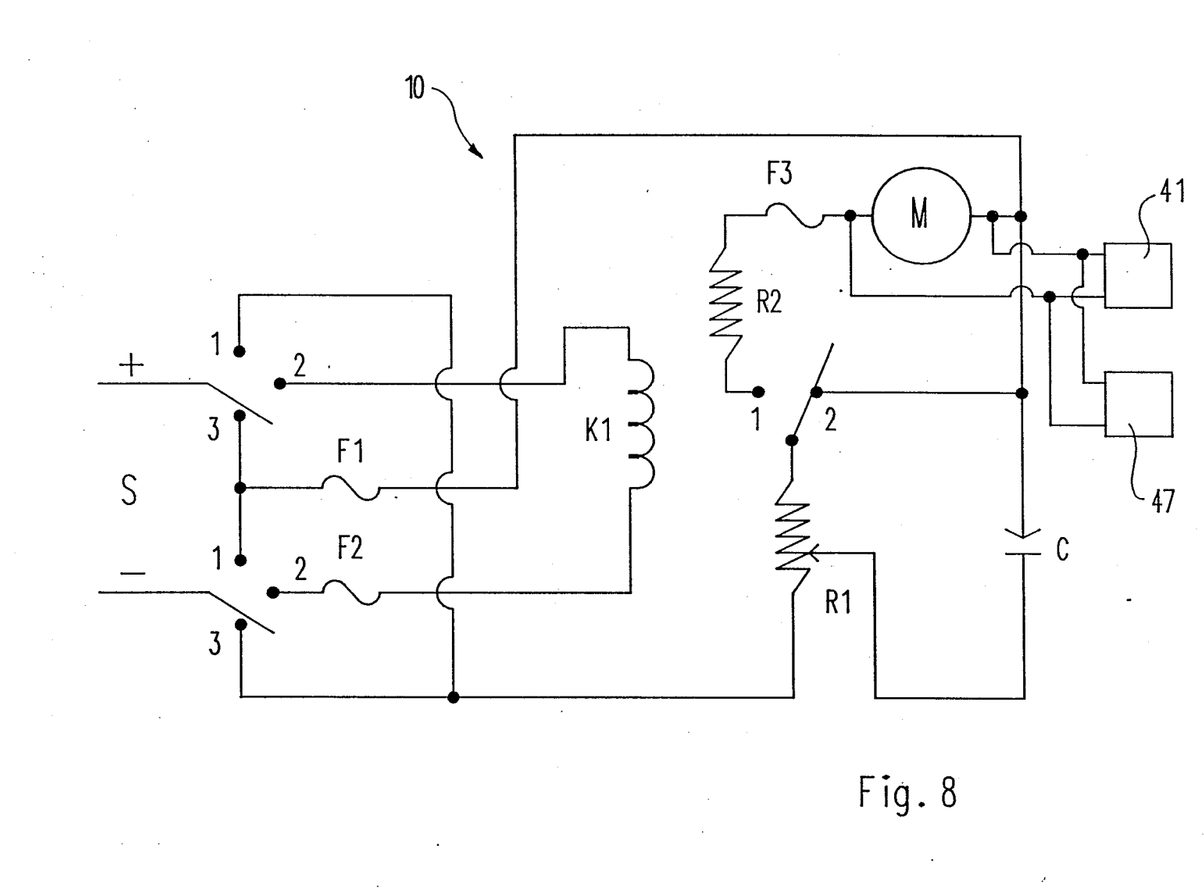
FIG. 8 is a schematic diagram illustrating a control circuit according to the first embodiment of the present invention.

FIG. 8 illustrates a schematic diagram of the control circuit utilized in the first embodiment 10 of the present invention illustrated in FIGS. 1 through 4. The motor M is a DC permanent magnet type motor. A capacitor C has a first terminal connected to a first armature contact on the motor M. A variable resistor R1 has a first terminal connected to a second terminal of the capacitor C. A relay K1 includes a contact 1 for connecting a second terminal of the resistor R1 to a second armature contact of the motor M when the relay K1 is energized. The relay includes a second contact 2 for connecting the second terminal of the resistor R1 to the first terminal of the capacitor C when the relay K1 is de-energized. A three position switch S has a first position 1 for charging the capacitor C in a first polarity and a second position 3 for charging the capacitor to an opposite polarity and a third position 2 for energizing the relay K1 to discharge the capacitor C through the motor M. The switch S is connected to the vehicle battery. As shown in FIG. 6, when the switch portion 56 is depressed, the capacitor C is charged to a first polarity. When the switch is released, it will return by a spring bias to the central position 2, thus energizing the relay K1. This causes the capacitor C to discharge through the variable resistor R1 and through the motor M. The discharge rate of the capacitor C may be controlled by the resistor R1 and by a suitable selection of the value of the resistor R2. Alternatively, the variable resistor R1 may be swapped with the fixed resistor R2. As is well known, the capacitor C has a discharge rate determined by the RC time constant of the R1-C circuit. During the first time constant after the capacitor is connected to the motor M, a major portion of the charge on the capacitor C will dissipate, thus providing a high initial voltage to the motor M. This provides a high initial drive torque which is effective to overcome the inertia of the actuating linkage illustrated in FIGS. 1 through 3. After five time constants of the RC circuit, the capacitor C is essentially fully discharged. As the discharge voltage of the capacitor C decreases exponentially, the induced EMF voltage in the motor M limits current flow through the motor, tending to regulate the motor speed. When it is desired to close the vent, the switch portion 58 illustrated in FIG. 6 is depressed and then released. This charges the capacitor C to an opposite polarity and then energizes the relay K1, discharging the capacitor C through the motor M. However, the armature contacts on the motor M will now have an opposite polarity, causing the motor M to rotate in an opposite direction. Upon activation of the motor M, the clamp caliper coils 41 and 47 are also energized to release the actuating arm from the clamping mechanism.

Figure 9:
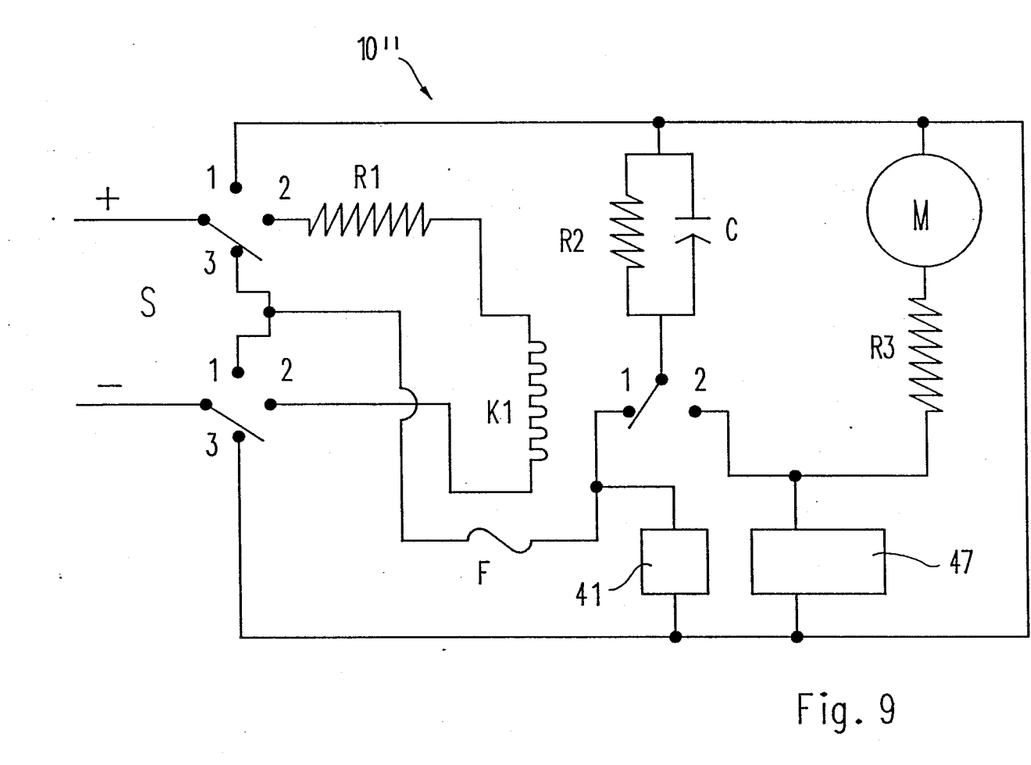
FIG. 9 is a schematic diagram illustrating a modified control circuit.

FIG. 9 illustrates a slightly modified control circuit 10'' for use with the first embodiment 10 of the present invention illustrated in FIGS. 1 through 4. R1 in FIG. 9 represents various accessories which may be connected for automatic actuation when the switch S is in position 2, energizing the relay coil K1. When the switch S is moved to position 1, the capacitor C will be charged to a first polarity. When the switch S is in position 3, the capacitor C will be charged to an opposite polarity.

When the switch S is in position 2, the relay K1 will be energized causing the relay contact to move to position 2, discharging the capacitor C through the motor M. Upon activation of the motor M, the clamp caliper coils 41 and 47 are also energized to release the actuating arm from the clamping mechanism.

Figure 10:
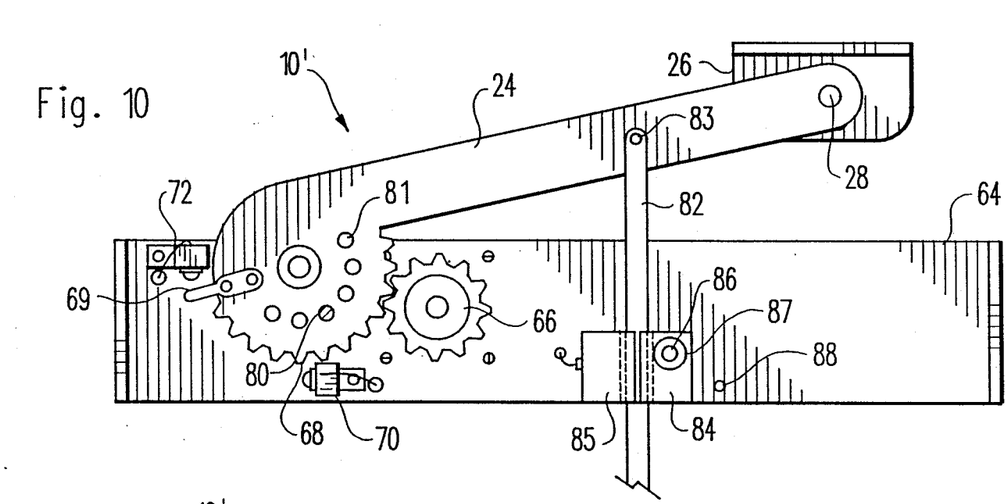
FIG. 10 is a side view illustrating an actuating linkage according to a second embodiment of the present invention.

FIG. 10 illustrates the operating linkage utilized in the second embodiment 10' of the present invention. A mounting bracket 64 adapted for mounting adjacent the vent has a pivotally mounted actuating arm 24 having a first end provided with an arcuate gear segment 68. An opposite end of the actuating arm 24 is pivotally mounted at 28 to a bracket 26 adapted for securement to the pivotal roof vent. A drive gear 66 is mounted for rotation on the bracket 64 in engagement with the gear segment 68. A protruding stop 69 is provided at one end of the arcuate gear segment 68 for contact with a pair of travel limit switches 70 and 72 disposed at opposite travel limits of the stop 69. A plurality of holes 81 are formed through the gear segment for engagement with a solenoid actuated stop pin 80 utilized to secure the actuating arm 24 in an adjusted position. Upon energizing the solenoid, the pin 80 will be retracted from engagement with the gear segment 68, allowing adjustment of the vent position. When adjustment is complete, the pin 80 will be spring biased to the extended position, and wind force or vibration will cause the actuating arm 24 to move a sufficient extent to allow the pin 80 to engage the nearest one of the holes 81. An alternative or additional clamping mechanism may employ a pivotal retaining rod 82 secured by a pivot pin 83 to the arm 24 and extending through electromagnetic clamping jaws 84 and 85. The clamping jaw frame is pivotally mounted by virtue of a sleeve 87 received around a bolt 86. This pivotal connection allows compensation for the angular movement of the arm 24 and retaining rod 82. A stop pin 88 limits pivotal movement of the clamping jaw frame.

Figure 11:
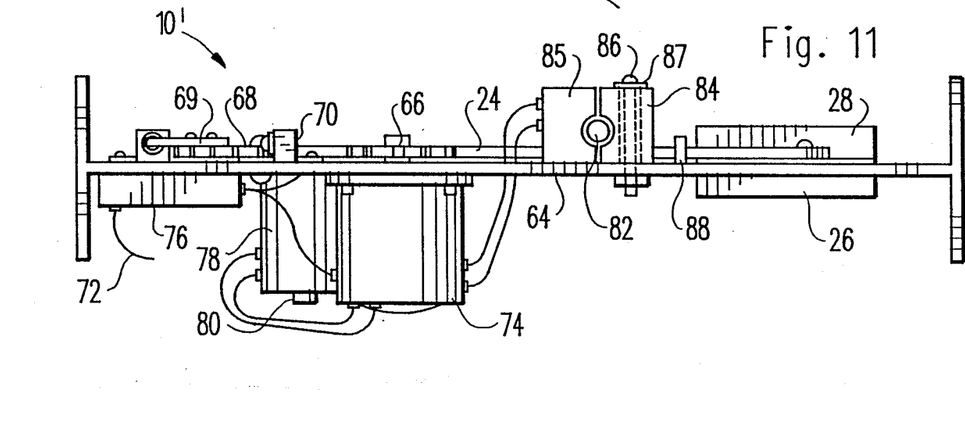
FIG. 11 is a bottom view of the actuating linkage of FIG. 10.

As shown in FIG. 11, the limit switches 70 and 72 are connected to a servo motor 74 through a conventional control unit 76. In operation, the switches 70 and 72 serve to de-actuate the servo motor 74 at the opposite travel limits of the stop 69. The motor 74 is a conventional servo motor which has a rotor controlled by the position of the servo actuator 62, illustrated in FIG. 5. Thus, a precise vent control may be obtained through the use of the remote control unit 60. The stop pin 80 is retracted by a solenoid 78 connected for simultaneous actuation with the motor 74.

Figure 12:
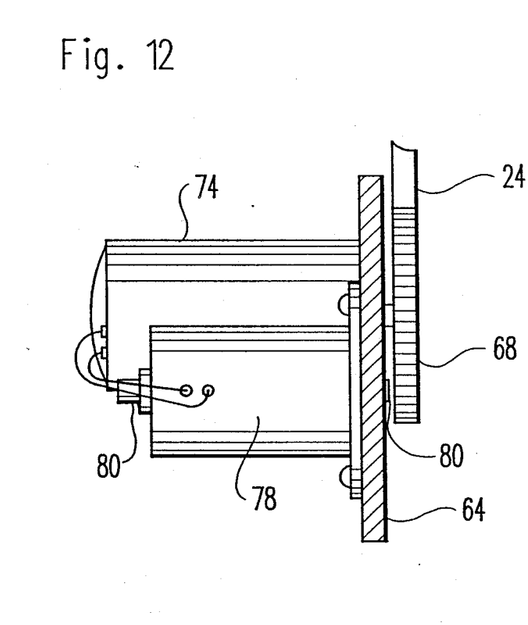
FIG. 12 is a detail view illustrating an electromagnetic actuating arm clamping mechanism.

FIG. 12 is a detail view which illustrates the electromagnetic clamping mechanism shown in FIGS. 10 and 11, with a slight pivotal mounting bracket modification. In place of the sleeve 87, the clamping jaw frame 90 is pivotally secured by a pin or bolt 86 to a bracket 89. The bracket 89 will then be secured to the support 64 shown in FIGS. 10 and 11. The clamping mechanism includes a pair of jaws 84 and 85 which are mounted for reciprocal linear movement along pins 91 and 92. The jaws 84 and 85 include concave arcuate gripping surfaces 97 and 98, each coated with a friction enhancing material for clamping engagement with the retaining arm 82. The jaws 84 and 85 are biased together by springs 93, 94, 95, and 96. The jaws include coils 99 and 100, each having an internal iron core, which produce repulsive electromagnetic forces when energized to release the jaws 84 and 85 from clamping engagement with the retaining arm 82, against the bias of the springs 93, 94, 95 and 96.

Figure 13:
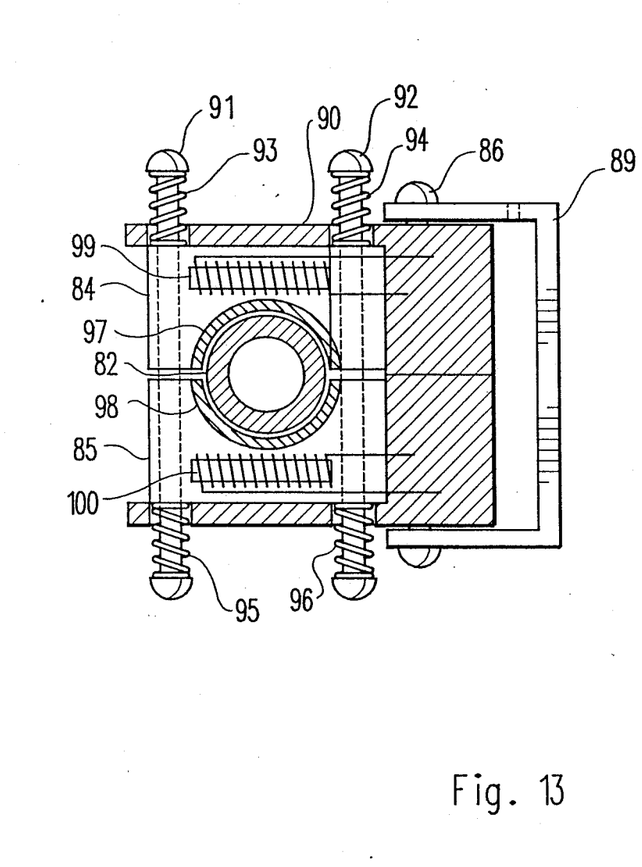
FIG. 13 is a cross sectional view illustrating a solenoid actuated actuating arm position locking pin of the actuating linkage of FIG. 10.

FIG. 13 is a cross sectional view which further illustrates the solenoid actuated locking pin shown in FIGS. 10 and 11. The pin 80 is received for reciprocal linear movement through the support 64, and is illustrated in a retracted position, out of engagement with the gear segment 68. In this position, the solenoid coil 78 is energized.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In a vent actuator mechanism for opening a vent, the improvement comprising:
   a DC permanent magnet motor;
   a capacitor having a first terminal connected to a first armature contact on said motor;
   a variable resistor having a first terminal connected to a second terminal of said capacitor;
   a relay for connecting a second terminal of said resistor to a second armature contact of said motor when said relay is energized and for connecting said second resistor terminal to said first capacitor terminal when said relay is de-energized; and
   a three position switch having a first position for charging said capacitor in a first polarity, a second position for charging said capacitor to an opposite polarity and a third position for energizing said relay to discharge said capacitor through said motor.

2. The vent actuator mechanism of claim 1, further comprising:
   a guide track adapted for mounting adjacent said vent;
   a slider mounted for reciprocal linear movement along said guide track;
   an actuating arm having a first end pivotally mounted to said slider and a second end adapted for pivotal connection to said vent;
   a pair of pulleys mounted at opposite ends of said guide tracks;
   a flexible endless drive member supported by said pulley;
   means securing said slider to said endless drive member; and
   said motor connected for selectively rotating one of said pulleys in opposite directions.

3. The vent actuator mechanism of claim 2, further comprising a pair of position indicating switches disposed at opposite ends of said track for engagement with said slider; and
   a pair of remote indicating lights connected for actuation by said position indicating switches.

4. The vent actuator mechanism of claim 2, further comprising an electromagnetically actuated clamping mechanism for securing said actuating arm in an adjusted position.

5. The vent actuator mechanism of claim 4, wherein said clamping mechanism comprises a pair of caliper arms mounted for reciprocal linear movement into and out of engagement with said actuating arm;
spring means biasing said caliper arms into engagement with said actuating arm; and
electromagnetic means for moving said caliper arms out of engagement with said actuating arm.

6. An actuator for opening a vent in a vehicle, comprising:
a mounting bracket adapted for mounting adjacent said vent;
an actuating arm having a first end pivotally mounted on said bracket and a second end adapted for pivotal connection to said vent;
a gear segment on said first end of said arm;
a drive gear mounted on said bracket in engagement with said gear segments;
a servo motor on said bracket connected for rotating said drive gear;
a protruding stop at one end of said gear segments;
a pair of limit switches mounted on said bracket for abutment with said stop at opposite travel limits of said gear segments;
control means connected to said limit switches and said servo motor for stopping said motor at said travel limits; and
a remote servo actuator coupled to said servo motor.

7. The vent actuator of claim 6, further comprising an electromagnetically actuated clamping mechanism for securing said actuating arm in an adjusted position.

8. The vent actuator of claim 7, wherein said clamping mechanism comprises a retaining rod pivotally secured to said actuating arm;
a pair of caliper arms mounted for reciprocal linear movement into and out of engagement with said retaining rod;
spring means biasing said caliper arms into engagement with said retaining rod; and
electromagnetic means for moving said caliper arms out of engagement with said retaining rod.

9. The vent actuator of claim 6, further comprising solenoid actuated stop means for retaining said actuating arm in an adjusted position.

10. The vent actuator of claim 9, further comprising a plurality of apertures formed in an arcuate spaced array through said gear segment; and
a solenoid mounted on said mounting bracket, said solenoid operably connected for simultaneous actuation with said motor and having a pin positioned for insertion through one of said gear segment apertures when said solenoid is deenergized.

11. An actuator for opening a vent in a vehicle, comprising:
a guide track adapted for mounting adjacent said vent;
a slider mounted for reciprocal linear movement along said guide track;
an actuating arm having a first end pivotally mounted to said slider and a second end adapted for pivotal connection to said vent;
a pair of pulleys mounted at opposite ends of said guide tracks;
a flexible endless drive member supported by said pulley;
means securing said slider to said endless drive member;
motor means for selectively rotating one of said pulleys in opposite directions; and
an electromagnetically actuated clamping mechanism for securing said actuating arm in an adjusted position.

12. The vent actuator of claim 11, wherein said clamping mechanism comprises a pair of caliper arms mounted for reciprocal linear movement into and out of engagement with said actuating arm;
spring means biasing said caliper arms into engagement with said actuating arm; and
electromagnetic means for moving said caliper arms out of engagement with said actuating arm.

13. The vent actuator of claim 11, wherein said motor means comprises a permanent magnet DC motor;
a capacitor selectively connectable for discharging through said motor; and
means for selectively charging said capacitor in opposite polarities.

14. The vent actuator of claim 13, further comprising a relay for selectively connecting said capacitor to said motor.

15. The vent actuator of claim 14, further comprising a variable resistor connected between said capacitor and said motor for controlling said motor by regulating the discharge rate of said capacitor.

16. The vent actuator of claim 15, further comprising a three position switch having a first position for charging said capacitor to a first polarity, a second position for charging said capacitor to an opposite polarity and a third position for actuating said relay to connect said capacitor to said motor.

17. The vent actuator of claim 16, wherein said switch is biased to said third position.

* * * * *